United States Patent
Takebe et al.

(10) Patent No.: US 8,470,448 B2
(45) Date of Patent: Jun. 25, 2013

(54) ACRYL RESIN CONTAINING FILM, POLARIZING PLATE BY USE THEREOF AND LIQUID CRYSTAL DISPLAY

(75) Inventors: Takashi Takebe, Tama (JP); Masataka Takimoto, Machida (JP); Nobuo Kubo, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 386 days.

(21) Appl. No.: 12/863,735

(22) PCT Filed: Oct. 15, 2008

(86) PCT No.: PCT/JP2008/068640
§ 371 (c)(1),
(2), (4) Date: Jul. 20, 2010

(87) PCT Pub. No.: WO2009/096071
PCT Pub. Date: Aug. 6, 2009

(65) Prior Publication Data
US 2010/0291376 A1   Nov. 18, 2010

(30) Foreign Application Priority Data

Jan. 30, 2008 (JP) .................................. 2008-018860

(51) Int. Cl.
*B32B 27/00* (2006.01)
*C09K 19/00* (2006.01)

(52) U.S. Cl.
USPC .......................................... 428/500; 428/1.1

(58) Field of Classification Search
None
See application file for complete search history.

(56) References Cited

U.S. PATENT DOCUMENTS

| | | | | |
|---|---|---|---|---|
| 7,709,572 | B2 * | 5/2010 | Takebe et al. | 525/54.21 |
| 8,168,702 | B2 * | 5/2012 | Takebe et al. | 524/37 |
| 2007/0282038 | A1 * | 12/2007 | Bhattacharya et al. | 524/31 |
| 2008/0160257 | A1 * | 7/2008 | Takada et al. | 428/145 |
| 2010/0239787 | A1 | 9/2010 | Kasahara et al. | |

FOREIGN PATENT DOCUMENTS

| | | | |
|---|---|---|---|
| JP | 5-119217 | A | 5/1993 |
| JP | 5-306344 | A | 11/1993 |
| JP | 2002-12728 | A | 1/2002 |
| JP | 2002-356658 | A | 12/2002 |
| JP | 2003-12859 | A | 1/2003 |
| JP | 2005-146084 | A | 6/2005 |
| JP | 2007-62055 | A | 3/2007 |
| JP | 2007-191706 | A | 8/2007 |
| JP | 2007-231157 | A | 9/2007 |
| WO | WO 2007/148496 | A1 | 12/2007 |

OTHER PUBLICATIONS

U.S. Appl. No. 12/863,706, filed Jul. 20, 2010, Confirmation No. 8968.
Chinese Office Action dated Jan. 31, 2012 (and English translation thereof) in counterpart Chinese Application No. 200880125695.9.
Chinese Office Action dated Aug. 29, 2012 (and English-language translation thereof) in counterpart Chinese Application No. 200880125695.9.

* cited by examiner

*Primary Examiner* — Sheeba Ahmed
(74) *Attorney, Agent, or Firm* — Holtz, Holtz, Goodman & Chick PC (57) ABSTRACT

An acryl resin-containing film which is transparent and highly heat-resistant and has been significantly improved in brittleness is disclosed, satisfying the following equations (1) to (4), exhibiting a tension softening point of 105 to 145° C. and a photoelastic coefficient of $-5.0\times10^{-8}$ to $8.0\times10^{-8}$ cm²/N, while causing no ductile fracture. There is also disclosed a liquid crystal display which has achieved an improved yield in works of stamping a polarizing plate or sticking the plate to a panel and reduced color shift occurred depending on viewing angle.

$|R_o(589)| \leq 10$ nm          Equation (1)

$|R_{th}(589)| \leq 20$ nm          Equation (2)

$|R_o(480) - R_o(630)| \leq 5$ nm          Equation (3)

$|R_{th}(480) - R_{th}(630)| \leq 10$ nm          Equation (4)

Numerical values of 589, 480 and 630 in parentheses represent the wavelength (nm) of a light used to measure an individual birefringence.

5 Claims, 1 Drawing Sheet

ACRYL RESIN CONTAINING FILM, POLARIZING PLATE BY USE THEREOF AND LIQUID CRYSTAL DISPLAY

This application is the United States national phase application of International Application PCT/JP2008/068640 filed Oct. 15, 2008.

TECHNICAL FIELD

The present invention relates to an acryl resin-containing film, a polarizing plate by use thereof and a display, and in particular to a liquid crystal display device using an acryl resin-containing film blending an acryl resin and a cellulose ester resin, thereby achieving improved yield in works of stamping a polarizing plate or sticking it to a panel and reduced color shift occurred depending on viewing angle.

TECHNICAL BACKGROUND

Polymethyl methacrylate (hereinafter, also denoted simply as PMMA) as a representative of conventional acryl resin is used for optical films due to its excellent transparency and dimensional stability and low hygroscopicity (as set forth in patent document 1).

However, a PMMA film has had problems such that it is deficient in heat resistance and is easily deformed by use under high temperature or over long duration.

Such problems were essential problems to be overcome not only in a physical property of as a simple substance of a film but also in a polarizing plate or display using such a film. Namely, in a liquid crystal display, a polarizing plate curls along with deformation of the film and is bent, resulting in the change in designed retardation and producing problems such that variation in viewing angle or change in color occurs.

There was proposed a method in which a polycarbonate (hereinafter, also denoted simply as PC) was added to an aryl resin to improve heat resistance, but in such a method, usable solvents are limited and miscibility of resins was insufficient, easily causing milky-whitening and making it difficult to use for an optical film (as set forth in patent document 2).

There was also disclosed a method of introducing an alicyclic alkyl group as a copolymerizing component of an acryl resin or a method in which an intramolecular cyclization reaction is performed to form a cyclic structure in the molecular backbone (as set forth in patent documents 3, 4 and 5).

However, these methods improved in heat resistance but were markedly inferior in brittleness of the film and such deteriorated brittleness promoted deformation of a panel, rendering it difficult to inhibit change in; in addition, these films exhibited a high photoelastic coefficient and yielded an excessive retardation when a stress was applied, therefore, problems such as variation in viewing angle or change in color were not overcome.

It is necessary to control the retardation of transmitted light and its wavelength dispersibility to inhibit decoloring, coloring or the like of a liquid crystal display, so-called color shift and to achieve enhanced contrast in all directions, but such wavelength dependency was not sufficiently controlled by the foregoing film.

Patent document 1: JP 5-119217A
Patent document 2: JP 5-306344A
Patent document 3: JP 2002-012728A
Patent document 4: JP 2005-146084A
Patent document 5: JP 2007-191706A

DISCLOSURE OF THE INVENTION

Problems to be Solved

Therefore, the present invention has come into being and it is an object of the invention to provide an acryl resin-containing film which is transparent and highly heat-resistant and has been significantly improved in brittleness. Further, it is also an object of the invention to provide a liquid crystal display device which has achieved an improved yield in works of stamping a polarizing plate or sticking the plate to a panel and reduced color shift occurred depending on viewing angle, by use of the acryl resin-containing film.

Means for Solving the Problems

The objects of the invention are realized by the following constitution.

1. An acryl resin-containing film satisfying the following equations (1) to (4) and exhibiting a tension softening point of 105 to 145° C. and a photoelastic coefficient of $-5.0\times10^{-8}$ to $8.0\times10^{-8}$ cm$^2$/N without causing ductile fracture:

$|R_o(589)| \leq 10$ nm      Equation (1)

$|R_{th}(589)| \leq 20$ nm      Equation (2)

$|R_o(480) - R_o(630)| \leq 5$ nm      Equation (3)

$|R_{th}(480) - R_{th}(630)| \leq 10$ nm      Equation (4)

wherein $R_o = (nx-ny) \times d$, $R_{th} = [(nx+ny)/2 - nz] \times d$; nx is a refractive index in a direction of a slow axis in a plane of the film, ny is a refractive index in a direction perpendicular to the slow axis in the plane, nz is a refractive index in a direction of thickness; d is a thickness of the film; and numerical values of 589, 480 and 630 in parentheses are each a wavelength (nm) of a light used to measure an individual birefringence.

2. The acryl resin-containing film described in the foregoing 1, wherein the acryl resin-containing film comprises an acryl resin (A) and a cellulose ester resin (B), or the acryl resin (A), the cellulose ester resin (B) and a resin (D) other than the acryl resin (A) and the cellulose resin (B) and exhibiting an Abbe's number of 30 to 60, and the acryl resin-containing film exhibiting a haze value of less than 2%.

3. The acryl resin-containing film described in the foregoing 1 or 2, wherein the acryl resin-containing film comprises the acryl resin (A) in an amount of 30 to 90% by mass, the cellulose ester resin (B) in an amount of 5 to 65% by mass and the resin (D) other than the acryl resin (A) and the cellulose resin (B) and exhibiting an Abbe's number of 30 to 60 in an amount of 0 to 50% by mass 4. The acryl resin-containing film described in the foregoing 2 or 3, wherein the acryl resin (A) has a weight average molecular weight (Mw) of 80000 to 1000000, and the cellulose ester resin (B) has a weight average molecular weight (Mw) of 75000 to 250000 and exhibits a total degree (T) of substitution with acyl groups of 2.00 to 2.99, in which a degree (ac) of substitution with an acetyl group is from 0.10 to 1.89 and a degree (r) of substitution with acyl groups having the number of carbon atoms of 3 to 7 is from 1.10 to 2.89.

5. The acryl resin-containing film as described in any of the foregoing 1 to 4, wherein the haze value is less than 1%.

6. A polarizing plate provided, on at least one side thereof, with an acryl resin-containing Elm as described in any of the foregoing 1 to 5.

7. A liquid crystal display provided with an acryl resin-containing film as described in any of the foregoing 1 to 5.

Effect of the Invention

In the invention, there can be provided a liquid crystal display device in which an improved yield when stamping a polarizing plate or sticking the plate to a panel and reduced color shift occurring, depending on viewing angle, has been achieved by use of the acryl resin-containing film having blended an acryl resin and a cellulose ester resin.

DESCRIPTION OF DESIGNATION

| | |
|---|---|
| 1: | Dissolving vessel |
| 3, 6, 12, 15: | Filtration equipment |
| 4, 13: | Stock tank |
| 5, 14: | Liquid supply pump |
| 8, 16: | Conduit pipe |
| 10: | Ultraviolet absorbent charging vessel |
| 20: | Confluence pipe |
| 21: | Mixer |
| 30: | Die |
| 31: | Metal support |
| 32: | Web |
| 33: | Peeling position |
| 34: | Tenting device |
| 35: | Roll drying device |
| 41: | Particle charging vessel |
| 42: | Stock tank |
| 43: | Pump |
| 44: | Filtration equipment |

PREFERRED EMBODIMENTS OF THE INVENTION

Now, there will be described the present invention in detail.

Acryl Resin Containing Film

The acryl resin-containing film of the invention is featured in that the film satisfies the following equations (1) to (4), exhibits a tension softening point of 105 to 145° C. and a photoelastic coefficient of $-5.0 \times 10^{-8}$ to $8.0 \times 10^{-8}$ cm$^2$/N, while satisfying the following equations (1) to (4), and resulting in no ductile fracture:

$$|R_o(589)| \leq 10 \text{ nm} \quad (1)$$

$$|R_{th}(589)| \leq 20 \text{ nm} \quad (2)$$

$$|R_o(480) - R_o(630)| \leq 5 \text{ nm} \quad (3)$$

$$|R_{th}(480) - R_{th}(630)| \leq 10 \text{ nm} \quad (4)$$

wherein $R_o$ and $R_{th}$ are each represented by $R_o=(nx-ny)d$, and $R_{th}=[(nx+ny)/2-nz]d$; nx represents a refractive index in the direction of a slow axis in a plane of the film, ny represents a refractive index in the direction perpendicular to the slow axis in the plane, nz represents a refractive index in the direction of thickness; d represents a thickness of the film; and numerical values of 589, 480 and 630 in parentheses are each the wavelength (nm) of a light used for measurement of an individual birefringence. The photoelastic coefficient is a value measured at a wavelength of 589 nm.

It is preferred that the acryl resin-containing film comprises an acryl resin (A) and a cellulose ester resin (B), or the acryl resin (A), the cellulose ester resin (B) and a resin (D) other than the acryl resin (A) and the cellulose resin (B), and the resin (D) exhibiting an Abbe's number of 30 to 60, and the acryl resin-containing film exhibiting a haze value of less than 2%. The haze value preferably is less than 1%.

It is preferred that the acryl resin-containing film comprises the acryl resin (A) in an amount of 30 to 90% by mass, the cellulose ester resin (B) in an amount of 5 to 65% by mass and the resin (D) other than the resins (A) and (B) and exhibiting an Abbe's number of 30 to 60 in an amount of 0 to 50% by mass.

It is further preferred that the acryl resin (A) is not less than 50% by mass. An increased amount of an acryl resin component inhibits dimensional change under high temperature and high humidity and results in reduced curling or bending of the polarizing plate, rendering it feasible to maintain the foregoing physical properties over a long duration.

In the invention, ductile fracture, which is caused when a stress stronger than the strength of a material is applied to the material, is defined as fracture accompanied by marked elongation or contraction of the material until reaching final rupture. The fracture surface characteristically forms thereon a number of dents, called dimples.

Therefore, "acryl resin-containing film causing no ductile fracture" has a feature that even when applying large stress to the film so as to bend the film double, no fracture is observed.

Requirement for brittleness of an optical film becomes higher from the viewpoint of an increased size of an optical film along with recent liquid crystal displays getting bigger, reworkability along with thin-film formation and productivity, therefore, no occurrence of the foregoing ductile fracture is required.

Such an acryl resin-containing film, causing no ductile fracture, can be achieved by constitution of materials of the invention, including an acryl resin, a cellulose ester, additives and the like, and selection thereof through a ductile fracture test, as described later.

Taking into account low haze and the use under an environment of high temperature, such as highly heated instruments, for example, a projector or a vehicle-mounted display instrument, an acryl resin-containing film related to the invention preferably controls the tension softening point so as to fall within a range of 110 to 145° C., and more preferably 120 to 140° C.

The acryl resin-containing film related to the invention preferably exhibits a glass transition temperature (Tg) of not less than 110° C., more preferably not less than 120° C., and still more preferably not less than 150° C.

In the invention, the glass transition temperature refers to a midpoint glass transition temperature, which is measured by using a scanning differential calorimeter (Type DSC-7, produced by Perkin Elmer Co.) at a temperature-increasing rate of 20° C./min in accordance with JIS K7121 (1987).

In the acryl resin-containing film of the invention, the number of defects having a diameter of 5 µm or more within the film surface is preferably not more than 1 defect/10 cm-square, more preferably not more than 0.5 defect/10 cm-square, and still more preferably not more than 0.1 defect/10 cm-square.

The diameter of a defect represents the diameter in the case when the defect is a circle, and in the case when a defect is not a circle, the range of the defect microscopically observed according to the following procedure and the maximum diameter (circumscribed circle diameter) is defined as the diameter of the defect.

In the case of a defect being a bubble or a piece of foreign matter, the range of the defect is the size of the shadow when observing the defect by a differential interference microscope.

In cases when a defect is a change in the surface form, such as transfer of a flaw on a roll or an abrasion mark, such a defect is observed by refection light of a differential interference microscope to confirm its size.

When the size of a defect is not clear in observation of the defect with reflection light, aluminum or platinum is vapor-deposited on the surface thereof to achieve observation.

To productively obtain a film superior in quality which is represented by such a defect frequency, it is effective to subject a polymer solution to highly precise filtration immediately before being cascaded or to set stepwise drying conditions after being cascaded to achieve drying efficiently with inhibiting foaming.

In cases of the number of defects being more than 1 defect/10 cm-square, for example, when tension is applied to a film in processing at the post step, the film is ruptured from the defect as a base point, often resulting in markedly reduced productivity.

A defect with a diameter of not less than 5 μm can be visually observed by using a polarizing plate, which may form a brightening point when used as an optical member.

Even when being not visually observed, uniform coating sometimes is not achieved, resulting in a defect (coating defect) when forming a hard coat layer on the film. In the invention, the defect refers to a void (foam defect) generated by rapid vaporization of a solvent in the drying step of solution film formation or a piece of foreign matter in the film (foreign matter defect) which is due to foreign matter existing in a stock solution for film formation or foreign matter incorporated in the process of film formation.

The acryl resin-containing film of the invention preferably exhibits a fracture elongation in at least one direction of 10% or more, and more preferably 20% or more, which is determined in accordance with JIS K7127 1999.

The upper limit of the fracture elongation is not specifically limited but is in reality approximately 250%. It is effective to inhibit a foreign matter or a defect in the film, due to foaming.

The thickness of the acryl resin-containing film of the invention is preferably not less than 20 μm and more preferably not less than 30 μm.

The upper limit of thickness is not specifically limited but when forming a film by a dope casting method, the upper limit is approximately 250 μm. The thickness of a film can be appropriately chosen in accordance with its use.

The acryl resin-containing film of the invention preferably exhibits a total light transmittance of not less than 90% and more preferably not less than 93%. The real upper limit thereof is approximately 99%. To realize an excellent transparency represented by such total light transmittance, it is effective that any additive or copolymerizing component which absorbs visible light is not introduced or foreign matter contained in a polymer is removed by precise filtration to reduce light diffusion or absorption within the film.

It is also effective to lessen the surface roughness of film contact portions in the course of dope casting (e.g., cooling roll, calender roll, drum, belt, coating base material in dope casting, transport roll), thereby achieving reduction in surface roughness of the film or to lessen the refractive index of an acryl resin, thereby achieving reduction in diffusion or reflection of light on the film surface.

The acryl resin-containing film of the invention preferably exhibits less than 2.0% of a haze value (turbidity) as a measure of transparency, and more preferably not more than 0.5% in terms of luminance or contrast when built in a liquid crystal display.

To achieve such a haze value, it is effective to remove foreign matter in a polymer through highly precise filtration to reduce light diffusion within the film.

The total light transmittance and haze value of the acryl resin-containing film are values measured in accordance with JIS K 7361-1-1997 and JIS K 7136-2000.

The acryl resin-containing film, which satisfies the foregoing physical properties, is usable as an acryl resin-containing film for optical use, but the composition described below renders it feasible to obtain a film excellent in workability and heat resistance.

Acryl Resin (A)

An acryl resin (A) usable in the invention include a methacryl resin. A resin comprising 50 to 99% by mass of a methyl methacrylate unit and 1 to 50% by mass of a monomer unit copolymerizable thereto is preferred.

Examples of such a copolymerizable monomer include an alkyl methacrylate with an alkyl having 2 to 18 carbon atoms; an alkyl acrylate with an alkyl group having 1 to 18 carbon atoms; α,β-unsaturated acid such as acrylic acid of methacrylic acid; an unsaturated group-containing bivalent carboxylic acid such as maleic acid, fumaric acid or itaconic acid; an aromatic vinyl compound such as styrene, α-methylstyrene or a nuclear-substituted styrene; α,β-unsaturated-nitril such as acrylonitrile or methacrylonitrile; maleic acid anhydride, maleimide, N-substituted maleimide and glutaric acid anhydride. These may be used singly or in combination.

Of these, methyl acrylate, ethyl acrylate, n-propyl acrylate, n-butyl acrylate, s-butyl acrylate or 2-ethylhexyl acrylate is preferred; and methyl acrylate or n0butyl acrylate is specifically preferred.

An acryl resin (A) used for the acryl resin-containing film of the invention preferably has a weight average molecular weight (Mw) of 80000 to 1000000 in terms of mechanical strength as a film and fluidity in production of the film.

The weight average molecular weight of an acryl resin used in the invention can be measured by gel permeation chromatography. The measurement conditions are as follows:

Solvent: Methylene chloride
Column: Three columns of Shodex K806 K805, K803G (made by Showa Denko Co., Ltd.) were connected
Column temperature: 25° C.
Sample concentration: 0.1% by mass
Detector: RI Model 504 (made by GL Science Co.)
Pump: L6000 (made by Hitachi, Ltd.)
Flow rate: 1.0 ml/min
Calibration curve: There was used calibration curve prepared from 13 samples of standard polystyrene STK (made by TOSO Co., Ltd.), Mw=2,800,000-500. Such 13 samples are used preferably at regular intervals.

A production method of the acryl resin (A) used in the invention is not specifically limited, and including methods known in the art, such as suspension polymerization, emulsion polymerization, block polymerization and solution polymerization. A polymerization initiator may use conventional peroxide or an azo type, or a redox type.

With respect to polymerization temperature, suspension or emulsion polymerization is carried out at a temperature of 30 to 100° C. and block or solution polymerization is carried out at a temperature of 80 to 160° C. To control reduction viscosity of a formed copolymer, it is preferred to perform polymerization with using a chain transfer agent such as an alkylmercaptan.

Compatibility of heat resistance and brittleness can be achieved by the molecular weight described above.

The acryl resin (A) of the invention may be a commercially available one. Examples thereof include Delpet 60N, 80N (made by Asahi Chemical Industry Co., Ltd.), Dianal BR52, BR80, BR83, BR85, BR88 (made by Mitsubishi Rayon Co., Ltd.) and KT75 (made by Denki Kagaku Kogyo Co., Ltd.).

In the acryl resin-containing film of the invention, one or more kinds of the acryl resin (A) are used, in which the weight average molecular weight of any of the acryl resins (A) is 80000 to 1000000.

Cellulose Ester Resin (B)

The acryl resin-containing film of the invention comprises one or more kinds of cellulose ester resin(s) (B) and at least one cellulose ester resin [hereinafter, also denoted as cellulose ester resin (B1)] has a total substitution degree (T) with acyl groups of 2.00 to 2.99, provided that the substitution degree (ac) with an acetyl group is from 0.10 to 1.89 and the substitution degree (r) with an acyl group of 3 to 7 carbon atoms is from 1.10 to 2.89, and having a weight average molecular weight of 75000 to 250000.

A cellulose ester resin (B) other than the cellulose ester resin (B1) [which is hereinafter also denoted as cellulose ester resin (B2)] has a total substitution degree (T) with acyl groups of 1.00 to 2.99, provided that the substitution degree (ac) with an acetyl group is from 0.10 to 2.99 and the substitution degree (r) with an acyl group other than the acetyl group is from 1.10 to 2.89.

The ratio of cellulose ester resin (B1) to cellulose ester resin (B2) is usable in a ratio of 100/0 to 50/50.

There may be used at least one cellulose ester resin (B1) and at least one cellulose ester resin (B2).

When the cellulose ester resin (B) of the invention is an ester with an aliphatic acyl group, such an acyl group is one having 2 to 20 carbon atoms and specific examples thereof include acetyl, propionyl, butyryl, isobutyryl, valeryl, pivaloyl, hexanoyl, octanoyl, lauroyl, and stearoyl.

In the invention, the foregoing aliphatic acyl group include one which is substituted with a substituent; when, in the foregoing aromatic acyl groups, the aromatic ring is a benzene ring, exemplified substituents for the benzene ring are cited.

When the cellulose ester resin (B) of the invention is an ester with an aromatic acyl group, the number of substituents (X) substituted for an aromatic ring is 0 or 1 to 5, preferably 1 to 3, and more preferably 1 or 2.

Two or more substituents substituted for an aromatic ring may be the same or different, and may combine with each other to form a condensed polycyclic compound (for example, naphthalene, indene, indan, phenanthrene, quinoline, isoquinoline, chromene, chroman, phthalazine, acridine, indole, indoline).

In the cellulose ester resin (B), a structure having chosen either a substituted or unsubstituted aliphatic acyl group or a substituted or unsubstituted aromatic acyl group is employed as a structure used for the cellulose resin of the invention, and these may be cellulose esters of a single acid or plural acids The cellulose ester resin (B) of the invention preferably is one having an acyl group with 2-7 carbon atoms, as a substituent, that is, at least one selected from cellulose acetate, cellulose propionate, cellulose butyrate, cellulose acetate propionate, cellulose acetate butyrate, cellulose acetate benzoate and cellulose benzoate.

Of these, the cellulose ester resin is specifically preferably cellulose acetate, cellulose propionate, cellulose butyrate, cellulose acetate propionate or cellulose acetate butyrate.

A lower fatty acid ester of cellulose acetate propionate or cellulose acetate butyrate of a mixed fatty acid is more preferred and one having an acyl group of 2-4 carbon atoms as a substituent is preferred.

A portion which is not substituted by an acyl group usually exists as an hydroxyl group. These can be synthesized by the method known in the art.

The degree of substitution with an acetyl group or with other acyl group can be determined by the method defined in ASTM-D817-96.

The weight average molecular weight (Mw) of the cellulose ester resin (B1) of the invention is preferably 75000 to 250000, and more preferably 100000 to 240000.

Resin (D) Other than Acryl Resin (A) and Cellulose Ester Resin and Exhibiting Abbe's Number of 30-60

A resin (D) used in the invention is a resin except for an acryl resin (A) and a cellulose ester resin (B), and exhibits an Abbe's number of 30 to 60.

The use of a resin of a Abbe's number falling within the foregoing range can control so that the wavelength distribution characteristic of a film falls within the preferred range of the invention, that is, $$|R_o(480)-R_o(630)| \leq 5 \text{ nm}$$

$$|R_{th}(480)-R_{th}(630)| \leq 10 \text{ nm}$$

and thereby, its use as a liquid crystal display makes it feasible to inhibit decoloring, coloring or the like of a liquid crystal display, so-called color shift and to achieve enhanced contrast in all directions.

There may be employed various resins (D) within a range not to vitiate the physical properties of the acryl resin-containing film of the inventions.

Specific examples thereof include methyl (meth)acrylate-styrene resin (styrene ratio of more than 50% by mass), copolymer of styrene and an unsaturated group-containing, bivalent carboxylic acid and an aromatic vinyl compound such as styrene, α-methylstyrene or nuclear-substituted styrene, for example, styrene-maleic acid anhydride, styrene-fumaric acid, styrene-itaconic acid or styrene-N-substituted maleimide; an indene copolymer such as indene-styrene resin or indene-methyl(meth)acrylate resin (in a copolymer with acrylate, the ratio of indene exceeds 50% by mass); olefin-maleimide copolymer, polycarbonate, polycycloolefin and octaacetyl saccharose.

Specifically, methyl (meth)acrylate resin (Abbe's number: 35-52), indene-methyl(meth)acrylate copolymer (Abbe's number: 34-51), indene-coumarone copolymer (Abbe's Number: 35-40) and the like easily come into effects of the invention and are preferably used.

There is also commercially available KT 75 (made by Denki Kagaku Kogyo Co., Ltd., methyl methacrylate-styrene copolymer, Abbe's Number: 46).

The Abbe's number was measured according to the method known in the art. Specifically, using an Abbe refractometer, the refractive indexes nc, nd and of in Fraunhofer C-line (656.3 nm), D-line (589.3 nm) and F-line (486.1 nm) are measured, respectively, and the Abbe's number is calculated according to the following equation:

$$\text{Abbe's number } (\nu d) = (nd-1)/(nf-nc)$$

It is preferred to conduct a miscibility test in advance to choose a resin (D) miscible with resin (A) and resin (B).

Specifically, the miscibility test is conducted in such a manner that 5% solutions in which resins (A), (B) and (D) were each dissolved in 100 ml methylene chloride were mixed to measure turbidity or visual observation of the mixing state. This test readily makes it possible to choose a resin.

Acryl Particle (C)

In the invention, acryl particles (C) may be contained in the acryl resin-containing film. When using acryl particles (C), it is effective to lessen the difference in refractive index between acryl resin (A) and acryl particle (C).

The acryl particles (C) exist preferably in a particulate state (also called immiscible state) together with the foregoing acryl resin (A) and cellulose ester (B) in the acryl resin-containing film of the invention.

The acryl particles (C) are preferably such that a prescribed amount of a prepared acryl resin-containing film is dissolved in a solvent with stirring and, after it is sufficiently dissolved and dispersed, is filtered by using a FIFE membrane filter having an average pore size less than the average particle size of the acryl particles (C), and the weight of a filtered insoluble is not less than 90% by mass of the acryl particles (C) added to the acryl resin-containing film.

The acryl particles (C) usable in the invention are not specifically limited but preferably are those having a layered structure of two or more layers, and a multi-layered acryl particulate composite, as described below, is specifically preferred.

Such a multi-layered acryl particulate composite refers to a particle-form acryl polymer having a structure in which an innermost hard lamellar polymer, a cross-linked soft lamellar polymer having rubber elasticity and an outermost hard lamellar polymer are laminated from the center toward the periphery.

One preferred embodiment of a multi-layered acryl particulate composite usable for the acryl resin composition of the invention is a multi-layered acryl particulate composite having a three-layer structure formed of an innermost hard layer polymer (a) obtained by polymerizing a monomer mixture composed of 80-98.9% by mass of methyl methacrylate, 1-20% by mass of an alkyl acrylate having an alkyl group of 1-8 carbons and 0.01-0.3% by mass of a poly-functional grafting agent; a cross-linked soft layer polymer (b) obtained by polymerizing, in the presence of the foregoing innermost hard layer polymer, a monomer mixture composed of 75-98.5% by mass of an alkyl acrylate having an alkyl group of 4-8 carbons, 0.01-5% by mass of a poly-functional curing agent and 0.5-5% by mass of poly-function grafting agent; an outermost layer polymer (c) obtained by polymerizing, in the presence of the innermost hard layer polymer and the cross-linked soft layer polymer, a monomer mixture of 80-99% by mass of methyl methacrylate and 1-20% by mass of an alkyl acrylate having an alkyl group of 1-8 carbons, in which the innermost hard layer polymer (a), innermost hard layer and the outermost layer polymer (c) are 5-40% by mass, 30-60% by mass and 20-50% by mass, respectively, and the multi-layered acryl particulate composite has an insoluble portion when subjected to fractional precipitation in acetone and the insoluble portion exhibits a degree of swell of 1.4 to 4.0 in methyl ethyl ketone.

As disclosed in JP 60-017406B and JP 3-390995B, further enhanced balance of shock resistance and stress whitening resistance can be realized not only by defining the composition of the individual layer of the multi-layered acryl particulate composite but also by setting a modulus of tensile elasticity of the multi-layered acryl particulate composite or a degree of swell in methyl ethyl ketone of the acetone-insoluble portion so as to fall within a specific range.

The innermost hard layer polymer (a) constituting the multi-layered acryl particulate composite is preferably one obtained by polymerizing a monomer mixture composed of 80-98.9% by mass of methyl methacrylate, 1-20% by mass of an alkyl acrylate having an alkyl group of 1-8 carbons and 0.01-0.3% by mass of a poly-functional grafting agent.

Specific examples of an alkyl acrylate having an alkyl group of 1-8 carbons include methyl acrylate, ethyl acrylate, n-propyl acrylate, n-butyl acrylate, s-butyl acrylate, and 2-ethylhexyl acrylate. Of these, methyl acrylate or n-butyl acrylate is preferred.

The ratio of an alkyl acrylate unit in the innermost hard layer polymer (a) is 1 to 20% by mass.

Examples of a poly-functional grafting agent include a poly-functional monomer having different polymerizable function groups, for example, an allyl ester of acrylic acid, methacrylic acid, maleic acid or fumaric acid.

The poly-functional grafting agent is used for chemical bonding of the innermost hard layer polymer to the soft layer polymer and the proportion used in polymerization of the innermost hard layer is from 0.01 to 0.3% by mass.

The cross-linked soft layer polymer (b) constituting the acryl particulate composite preferably is one obtained by polymerizing, in the presence of the foregoing innermost hard layer polymer (a), a monomer mixture composed of 75 to 98.5% by mass of an alkyl acrylate having an alkyl group of 4 to 8 carbons, 0.01 to 5% by mass of a poly-functional curing agent and 0.5 to 5% by mass of poly-functional grafting agent Preferred examples of such an alkyl acrylate having an alkyl group of 4 to 8 carbons include n-butyl acrylate and 2-ethylhexyl acrylate.

Further, another copolymerizable monomer in amount of not more than 25% by mass may be copolymerized together with these polymerizable monomers.

Examples of such a copolymerizable monomer include styrene and substituted styrene derivatives. With respect to a ratio of alkyl acrylate having an alkyl group of 4 to 8 carbons, the former is more than the latter, the glass transition temperature of the formed polymer (b) is more lowered and softened.

From the point of view of transparency of a resin composition, on the other hand, it is advantageous to bring a refractive index of a soft layer polymer (b) at ordinary temperature close to the innermost hard layer polymer (a), the outermost hard layer polymer (c) and the hard thermoplastic acryl resin, and the ratio of both is chosen in view of these.

In a small use of a cover layer thickness, for example, a styrene is not necessarily copolymerized.

A polyfunctional grafting agent may employ those cited in the foregoing innermost hard layer (a).

Such a polyfunctional grafting agent is used for chemical bonding of the soft layer polymer (b) to the outermost hard layer polymer (c) and the proportion used for polymerization of the innermost hard layer is preferably from 0.5 to 5% by mass from a viewpoint of its effect of providing shock resistance.

A polyfunctional crosslinking agent may employ generally known cross linking agents such as a divinyl compound, a allyl compound, a dimethacrylate compound and the like and it is preferred to use a polyethylene glycol diacrylate (having a molecular weight of 200-600).

The polyfunctional crosslinking agent is used to form a crosslinking structure at the time of polymerization of the soft layer (b) to achieve its effect of providing shock resistance.

However, when used in polymerization of the soft layer (b), the foregoing polyfunctional grafting agent forms a crosslinking structure of the soft layer (b) to some extent, so that a polyfunctional crosslinking agent is not necessarily an indispensable component but the proportion of a polyfunctional crosslinking agent used in polymerization of the soft layer is preferably from 0.01 to 5% by mass from the viewpoint of its effect of providing shock resistance.

The outermost hard layer polymer (c) constituting the multi-layered acryl particulate composite preferably is one obtained by polymerization of a monomer mixture composed of 80-99% by mass of methyl methacrylate and 1-20% by mass of an alkyl acrylate having 1-8 carbons in the presence of the innermost hard layer polymer (a) and the soft layer polymer (b).

Such an alkyl acrylate may employ one described above but is preferably methyl acrylate or ethyl acrylate. The proportion of an alkyl acrylate unit in the outermost hard layer (c) is preferably from 1 to 20% by mass.

Specifically, it is preferred to provide a molecular weight gradient of decreasing from the inside toward the outside to improve balance of elongation and shock resistance. Specifically, it is possible to decrease the molecular weight from the inside to the outside by a technique of dividing a monomer mixture to form the outermost hard layer to two or more groups and successively increasing the amount of a chain transfer agent to be added to each group.

The molecular weight formed therein can be found by polymerization of the individual monomer of the monomer mixture under the same condition and determination of the molecular weight of the obtained polymer.

The particle size of the multi-layered acryl particulate composite of a multi-structured polymer, used in the invention is not specifically limited and preferably not less than 20 nm and not more than 500 nm, and more preferably not less than 50 nm and not more than 400 nm.

In the particle size of the multi-layered acryl particulate composite of a multi-structured polymer, the mass ratio of core to shell is not specifically limited but when the whole of the multi-structured polymer is to be 100 parts by mass, the core is preferably not less than 50 parts by mass and not more than 90 parts by mass, and more preferably not less than 60 parts by mass and not more than 80 parts by mass.

Examples of commercially available products of such a multi-layered acryl particulate composite include "Metablen" produced by Mitsubishi Rayon Co., Ltd.; "Kane Ace" produced by Kanegafuchi Kagaku Kogyo Co., Ltd.; "Paraloid" produced by Kureha Kagaku Kogyo Co., Ltd.; "Acryloid" produced by Rohm & Haas Co.; "Staphyloid" produced by Ganz Chemical Co., Ltd.: and "Parapet" produced by KURARE Co., Ltd. These may be used singly or in combination.

Specific examples of acryl particles (c-1) of a graft copolymer, suitably used as acryl particles (C) include a grail copolymer obtained by copolymerization of a monomer mixture of an unsaturated carboxylic acid ester monomer, an unsaturated carboxylic acid monomer, an aromatic vinyl monomer and optionally a copolymerizable vinyl monomer in the presence of a rubber polymer.

A rubber polymer used for acryl particles (c-1) of a graft copolymer include a diene rubber, an acryl rubber and ethylene rubber. Specific examples thereof include a polybutadiene, styrene-butadiene copolymer, styrene-butadiene block copolymer, acrylonitrile-butadiene copolymer, butyl acrylate-butadiene copolymer, polyisoprene, butadiene-methyl methacrylate copolymer, butyl acrylate-methyl methacrylate copolymer, butadiene-ethyl acryl ate copolymer, ethylene propylene copolymer, ethylene-propylene-diene copolymer, ethylene-isopropylene copolymer, and ethylene-methyl acrylate copolymer. These rubber polymers may be used singly or in combination.

In cases when an acryl resin (A) and acryl particles (C) are each close to the other in refractive index, transparency of the acryl resin-containing film can be achieved and is preferable. Specifically, the difference in refractive index between acryl resin (A) and acryl particles (C) is preferably not more than 0.05, more preferably not more than 0.02, and still more preferably not more than 0.01.

To satisfy such a refractive index condition, the difference of refractive index can be reduced by a method of controlling the composition ratio of the individual monomers of an acryl resin (A) and/or and a method of the composition ratio of a rubber polymer or monomer used for the acryl particles (C), whereby an acryl resin-containing film excellent in transparency is obtained.

The acryl resin-containing film is dissolved, under appropriate conditions, in a solvent capable of dissolving the acryl resin (A) to obtain a milky-white solution, which is separated into a soluble component from an insoluble component by centrifugal separation; the thus separated soluble component [acryl resin (A)] and insoluble component [acryl particles (C)] are each purified and measured with respect to refractive index (at 23° C. and a measurement wavelength of 550 nm). The foregoing difference of refractive index refers to a difference in refractive index between the separated soluble component and the insoluble component.

In the invention, a method of mixing acryl particles (C) with an acryl resin (A) is not specifically limited but is conducted preferably in such a manner that the acryl resin (A) is blended with any other component in advance and is homogeneously melt-kneaded with adding the acryl particles (C) usually at 200 to 350° C. by a single- or twin-screw extruder.

There are also applicable a method in which a dispersion of acryl particles (C) is mixedly added to a solution (dope) and a method in which a solution containing acryl particles (C) and an appropriate additive is added in-line.

The acryl particles of the invention may employ commercially available ones. Examples thereof include Metablen W-341 (produced by Mitsubishi Rayon Co., Ltd.) and Chemisnow MR-2G(C3) and MS-300 X(C4) (produced by Soken Chemical & Engineering Co., Ltd.)

The acryl resin-containing film of the invention preferably contains 0.5 to 45% by mass of acryl particles (C), based on total mass of resins constituting the film.

Other Additives

The acryl resin-containing film of the invention may use a plasticizer to achieve enhanced fluidity or softness of a composite material.

Examples of a plasticizer include a phthalic acid ester, carboxylic acid ester, trimellitic acid ester, a polyester and an epoxy.

Of these, a polyester or phthalic acid ester plasticizer is preferred. A polyester plasticizer is superior in non-transferability or extraction resistance but slightly inferior in plasticizing effect or miscibility, compared to a phthalic acid ester plasticizer.

Therefore, these plasticizers are chosen or used in combination in accordance with needs and are applicable to a broad range of use.

Polyester plasticizers are reaction products of mono- to tetra-valent carboxylic acids and mono- to hexa-valent alcohols, and there is mainly used a reaction product of a bivalent carboxylic acid and a glycol. Typical examples of a di-valent carboxylic acid include a glutaric acid, itaconic acid, adipic acid, phthalic acid, azelaic acid and sebacic acid.

The use of adipic acid or phthalic acid can obtain a plasticizer superior in a plasticizing characteristic. Examples of a glycol include ethylene, propylene, 1,3-butylene, 1,4-butylene, 1,6-hexamethylene, neopentylene, diethylene and dipropylene glycols.

These di-valent carboxylic acid or glycols may be used singly or in combination.

Such an ester type plasticizer may be any form of an ester, oligoester and polyester, and the molecular weight may be in the range of 100 to 10000, and preferably, in the range of 600 to 30000 results in an enhanced plasticizing effect.

The viscosity of a plasticizer is relevant to molecular structure or molecular weight. The viscosity of an adipic acid plasticizer is suitably within a range of 200 to 5000 Pa·s (25° C.). Such an adipic acid plasticizer may be used in combination with some polyester plasticizers.

A plasticizer is added preferably in an amount of 0.5 to 30 parts by mass per 100 parts by mass of the acryl resin (A)-containing composition. When exceeding the amount of more than 30 parts by mass, the surface becomes sticky, which is not preferable for practical use.

The acryl resin (A)-containing composition preferably contains an ultraviolet absorbent, such as a benzotriazole, 2-hydroxybenzophenone or salicylic acid phenyl ester one. Specific examples of an ultraviolet absorbent include triazoles such as 2-(5-methyl-2-hydroxyphenyl)benzotriazole, 2-[2-hydroxy-3,5-bis(α,α-dimethylbenzyl)phenyl]-2H-benzotriazole and 2-(3,5-di-t-butyl-2-hydroxyphenyl)benzotriazole; and benzophenones such as 2-hydroxy-4-methoxybenzophenone, 2-hydroxy-4-octoxybenzophenone, and 2,2'-dihydroxy-4-methoxybenzophenone.

Of ultraviolet absorbents, an ultraviolet absorbent having a molecular weight of 400 or more, which exhibits a relatively high boiling point, is difficult to be vaporized and is not easily scattered even in formation at a high temperature, can effectively improve weather resistance by addition of a relatively small amount.

Further, transferability from a thin cover layer to the substrate layer is relatively small and deposition onto the surface of a laminated plate is difficult, so that it is preferred in terms of an amount of a contained ultraviolet absorbent content being maintained over long period of time and sustainability of a weather resistance improvement effect being superior.

Specific examples of an ultraviolet absorbent having a molecular weight of not less than 400 include a benzotriazole type such as 2-[2-hydroxy-3,5-bis(α,α-dimethylbenzyl)phenyl]-2-benzotriazole and 2,2-methylenebis[4-(1,1,2,3-tetrabutyl)-6-(2H-benzotriazole-2-yl)phenol]; a hindered amine type such as bis(2,2,6,6-tetramethyl-4-piperazyl)sebacate and bis(1,2,2,5,6-pentamethyl-4-piperidyl)sebacate; a hybrid type having a hindered phenol and a hindered amine in the molecule, such as 2-(3,5-di-t-butyl-4-hydroxybenzyl)-2-n-butylmalonic acid-bis(1,2,6,6-pentamethyl-4-piperidyl), and 1-{2-[3-(3,5-di-t-butyl-4-hydroxyphenyl)propionyloxy]ethyl}-4-[3-(3,5-di-t-butyl-4-hydroxyphenyl)propionyloxy]-2,2,5,6-tetramethylpiperidine. These may be used singly or in combination. Of these, 2-[2-hydroxy-3,5-bis(α,α-dimethylbenzyl)phenyl]-2-benzotriazole and 2,2-methylenbis[4-(1,1,2,3-tetrabutyl)-6-(2H-benzotriazole-2-yl)phenol] are specifically preferred.

Further, various kinds of antioxidants may be added to the acryl resin (A) used for the acryl resin-containing film of the invention to improve a thermal decomposition property or thermal coloring property at the time of fabrication. Addition of an antistatic agent enables to provide antistatic performance to the acryl resin-containing film.

There may be used a non-flammable resin composition blending a phosphorus flame retarder, as an acryl resin composition.

Examples of a phosphorus flame retarder include one or a mixture of two or more selected from a red phosphorus, a triazole phosphoric acid ester, a diaryl phosphoric acid ester, a monoaryl phosphoric acid ester, an arylphosphonic acid compound, an arylphosphine oxide compound, a condensed arylphosphoric acid ester, a halogen-containing, condensed phosphoric acid ester, A halogen-containing, condensed phosphonic acid ester, and a halogen-containing phosphorus acid ester.

Specific examples include triphenyl phosphate, 9,10-dihydro-9-oxa-10-phosphaphenathrene-10-oxide, phenylphosphonic acid, tris(β-chloroethyl)phosphate, tris(dichloropropyl)phosphate and tris(tribromoneopentyl)phosphate.

Film Forming

Now, there will be described methods of forming the acryl resin-containing film of the invention but the invention is not limited to these.

Examples of a method of forming the acryl resin-containing film of the invention include an inflation method, a T-die method, a calender method, a cutting method, a cascading method, an emulsion method, a hot press method and the like. Of these, solution casting by the cascading method is preferred in terms of inhibition of coloring, inhibition of foreign matter defects and inhibition of optical defects such as a die line.

Organic Solvent

An organic solvent useful for forming a dope when producing the acryl resin-containing film of the invention by a solution casting method may employ any one capable of dissolving an acryl resin (A), a cellulose ester resin (B), a resin (D) and additives.

Examples of a chlorinated organic solvent include methylene chloride and examples of a non-chlorinated organic solvent include methyl acetate, ethyl acetate, amyl acetate, acetone, tetrahydrofuran, 1,3-dioxorane, 1,40dioxane, cyclohexanone, ethyl formate, 2,2,2-trifluoroethanol, 2,2,3,3-hexafluoroˆ1-propanol, 1,3-difluoro-2-propanol, 1,1,1,3,3,3-hexafluoro-2-methyl-2-propanol, 1,1,13,3,3-hexafluoro-2-propanol, 2,2,3,3,3-pentafluoro-1-propanol and nitroethane. Of these, methylene chloride, methyl acetate, ethyl acetate or acetone is preferably used.

A dope preferably contains 1 to 40% by mass a straight-chain or branched aliphatic alcohol of 1 to 4 carbons in an amount of 1 to 40% by mass, in addition to the foregoing organic solvent. A large proportion of alcohol in the dope causes gelling of the web, making it easy to be stripped from the metal support and a small proportion of alcohol promotes dissolution of the acryl resin (A) and the cellulose ester resin (B) in a non-chlorinated organic solvent.

A dope composition in which a mixture of the acryl resin (A), the cellulose ester resin (B) and a resin (D) in an amount of 15 to 45% by mass is dissolved in a solvent containing methylene chloride and a straight-chain or branched aliphatic alcohol of 1 to 4 carbons, is specifically preferred.

Examples of such a straight-chain or branched aliphatic alcohol of 1 to 4 carbons include methanol, ethanol, n-propanol, iso-propanol, n-butanol, sec-butanol, and tert-butanol. Of these, ethanol is preferred in terms of dope stability, relative low boiling point and dryability.

In the following, there will be described a preferred film forming method of the acryl resin-containing film of the invention.

(1) Dissolving Step:

This is a step in which an acryl resin (A), a cellulose ester resin (B), a resin (D) and additives are dissolved in an organic solvent mainly composed of a good solvent for the acryl resin (A), cellulose ester resin (B), resin (D) and additives, in a dissolving kettle with stirring to form a dope, or a step in which an additive solution is mixed with a solution of the acryl resin (A), the cellulose ester resin (B) and the resin (D) to form a dope.

There are applicable various dissolution methods of the acryl resin (A), the cellulose ester resin (B) and the resin (D), including a method of performing dissolution under ordinary pressure, a method of performing dissolution at a temperature higher than the boiling point of the main solvent, a method of performing dissolution at a temperature higher than the boiling point of a main solvent with applying pressure, a method of performing dissolution through a cooling dissolution method, as described in JP 9-95544A, JP 9-95557A, and JP 9-95538A, and a method of performing dissolution under high pressure, as described in JP 11-21379A. Of these, a method of performing dissolution at a temperature higher than the boiling point of the main solvent with applying pressure is preferred.

The total content of the acryl resin (A), the cellulose ester resin (B) and the resin (D) in the dope is preferably in the range of 15 to 45% by mass. Additives are added to the dope dining or after being dissolved, dissolved or dispersed, filtered with a filter material and defoamed, and then transferred to the next stage by a liquid supplying pump.

Filtration is performed preferably by using a filtration material with a capture particle size of 0.5 to 5 μm and a filtration time of 10 to 25 sec/100 ml. In this method, flocculates remained after dispersing particles or coagulates produced when adding a main dope can be removed by using a filtration material with a capture particle size of 0.5 to 5 μm and a filtration time of 10 to 25 sec/100 ml.

The main dope is sufficiently low in particle concentration, as compared to the addition liquid and does not cause an abrupt increase of a filtration pressure, due to aggregation of coagulates.

Figure 1:
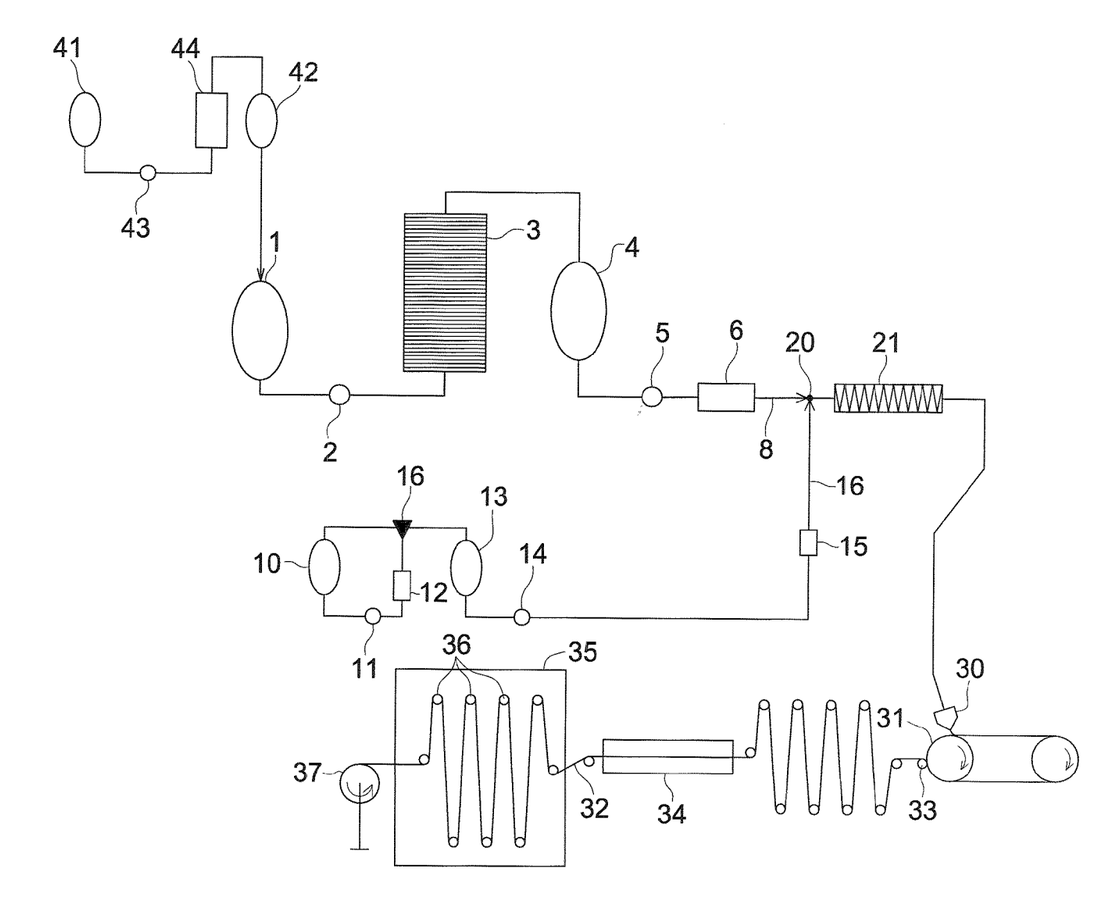
FIG. 1 illustrates a dope preparation step, a cascading step and a drying step in the dope cascade-casting method used in the invention.

FIG. 1 schematically shows a dope preparation step, cascading step and a drying step of a solution cascade casting method. Acryl particle solution is supplied from an acryl particle charging kettle 41 to a stock kettle 42, while removing large aggregates by a filter 44.

Then, the acryl particle solution is supplied from the stock kettle 42 to a main dope dissolving kettle 1. Thereafter, a main dope liquid is filtered by a main filter 3 and further thereto, an ultraviolet absorbent solution is added inline from "16".

In many cases, the main dope contains a recycled material in an amount of 10 to 50% by mass. Since the recycled material contains acryl particles, it is preferred to control an addition amount of the acryl particle solution in accordance with the addition amount of the recycled material.

The recycled material is a ground material of an acryl resin-containing film, which is produced in film-making of the acryl resin-containing film, including a material cut from both sides and a non-standard raw fabric of the acryl resin-containing film.

There is also preferably used a material obtained by kneading an acryl resin and acryl particles, followed by pelletization.

(2) Cascading Step:

This is a step of supplying the dope to a pressure die 30 through a liquid-supplying pump (for example, a pressure type constant-flow gear pump) and cascading the dope, from a pressure die slit, to the cascaded position on an endless metal belt such as a stain-less steel belt or a metal support such as a rotary metal drum.

A pressure die is preferred in which the slit form of the nozzle portion of a die is adjustable and uniform film thickness is easily controllable. The pressure die includes a coathanger die and a T-die and either of them is preferably used.

The surface of the metal support is a mirror surface. To increase a film-making speed, multiple layer formation may be performed by providing two or more pressure dies and dividing the dope into two or more. Alternatively, it is preferred to form a film of a layered structure by a co-cascading method of simultaneously cascading plural dopes.

(3) Solvent Evaporation Step:

This is a step of heating a web (herein, a dope film formed by cascading a dope onto a support is called a web) on a support to evaporate a solvent.

To evaporate a solvent, there are known a method of blowing air from the web side and/or a method of transferring heat through liquid from the back of the support, and a method of transferring heat from both sides. The method of transferring heat from the back is preferred in terms of drying efficiency.

A combination of these methods is also preferred. It is preferred to dry the web on a support under an atmosphere of 40 to 100° C. To maintain an atmosphere of 40 to 100° C., it is also preferred to blow air heated at that temperature to the upper surface of the web or to heat the surface by infrared rays.

(4) Peeling Step:

This is a step of peeling a solvent-evaporated web on the metal support at the peeling position. The thus peeled web is then conveyed to the next step.

The temperature at the peeling position on the metal support is preferably from 10 to 40° C., and more preferably from 11 to 30° C.

Peeling is performed preferably when the residual solvent quantity of the web on the metal support falls within a range of 50 to 120% by mass, depending on strength of drying conditions, length of the metal support and the like. When peeling at the time of a relatively high residual solvent quantity, an excessively soft web easily impairs flatness or easily causes wrinkling or longitudinal streaks, so that the residual solvent quantity is determined in balance of economical speed and quality.

The residual solvent quantity of the web is defined by the following equation:

$$\text{Residual solvent quantity (\%)} = \{[(\text{web mass before heating treatment}) - (\text{web mass after heating treatment})]/(\text{web mass after heating treatment})\} \times 100$$

wherein the heating treatment represents a heating treatment at 115° C. for 1 hr.

A peeling tension to peel film from the metal support is usually from 196 to 245 N/m, but in cases when wrinkling easily occurs, it is preferred to perform peeling at a tension of not more than 190 N/m, more preferably within a range of from the minimum peelable tension to 166.6 N/m, and still more preferably from the minimum peelable tension to 137.2 N/m, and it is specifically preferred to perform peeling at a tension of from the minimum peelable tension to 100 N/m.

In the invention, the temperature at the peeling position on the metal support is preferably from −50 to 40° C., more preferably from 10 to 40° C., and still more preferably from 15 to 30° C.

(5) Drying and Stretching Step:

After peeling, the web is dried by using a drying device 35 in which the web is conveyed with being alternately entrained about plural rolls arranged in the device and a tenter stretching device (a tenting device) 34 in which the web is conveyed by clipping both ends of the web with clips.

A drying means generally blows hot air onto the both surfaces of the web, but a heating means by applying microwaves in place of wind is also available. Excessively rapid drying easily impairs flatness of the finished film.

It is better to perform drying at a relatively high temperature after reaching a residual solvent quantity of 8% by mass or less. Drying is performed at 40 to 160° C. throughout most of the drying step and it is preferred to perform drying at 40 to 160° C.

In cases when using a tenter stretching device, it is preferred to use a device capable of controlling the gripping length (distance of from initiation to completion of gripping) of the film independently by right and left gripping means of the tenter on the sides of the film.

In the tenter stage, it is preferred to intentionally prepare areas differing in temperature to achieve enhanced flatness. It is also preferred to provide a neutral zone between areas differing in temperature to inhibit interference between the respective areas.

The stretching operation may be conducted multi-stepwise and it is also preferred to perform biaxial stretching in the casting direction and in the width direction. Further, biaxial stretching may be conducted simultaneously or stepwise.

In the case of "stepwise", it is feasible to perform stretching successively in different directions or it is also feasible that stretching in one direction is divided into multiple steps and stretching in a different direction is applied to any of the steps. Namely, for example, the following stretching steps are feasible:

Stretching in the casting direction/stretching in the width direction/stretching in a casting direction/stretching in the casting direction, Stretching in the width direction/stretching in the width direction/stretching in the casting direction/stretching in the casting direction.

Simultaneous biaxial-stretching includes stretching in one direction and relaxing tension in the other direction to be shrinked. A stretching ratio of simultaneous biaxial-stretching is preferably from 1.01 to 1.5 fold for both of the width direction and the longitudinal direction.

When performing tentering, a residual solvent quantity is preferably from 20 to 100% by mass at the start of tenter and it is preferred to perform drying with tentering until the residual solvent quantity reaches 10% by mass or less, and more preferably 5% by mass or less.

The drying temperature with tentering is preferably from 30 to 150° C., and more preferably 70 to 100° C.

In the tentering step, reduced atmospheric temperature distribution in the width direction is preferred in terms of enhancement of film uniformity and the atmospheric temperature distribution in the width direction is preferably within ±5° C., more preferably within ±2° C., and still more preferably within ±1° C.

(6) Winding Step:

This is a step of winding an acryl resin-containing film by a winder after the residual solvent quantity of the web reaches not more than 2% by mass. A residual solvent quantity of not more than 0.4% by mass makes it feasible to obtain a film excellent in dimensional stability.

A winding method may employ any generally known one and specific examples thereof include a constant torque method, a constant tension method, a taper tension method and a programmed tension control method of a constant internal stress, which are each employed for each purpose.

The acryl resin-containing film of the invention preferably is a long-length film, specifically is a 100 to 500 m one, and is usually provided in a roll form. The film width is preferably from 1.3 to 4 m, and more preferably from 1.4 to 2 m.

The thickness of the acryl resin-containing film of the invention is not specifically limited, and when used for a protective film for a polarizing plate to be described later, it is preferably from 20 to 200 μm, more preferably from 25 to 100 μm, and still more preferably from 30 to 80 μm.

Polarizing Plate

A polarizing plate used in the invention can be prepared by conventionally known methods. Preferably, an adhesive layer, which is provided on the back side of the acryl resin containing film of the invention, is adhered to at least one surface of a polarizer which was prepared by dip-stretching in an iodine solution.

A polarizing plate may optionally be subjected to a surface treatment, such as a corona discharge treatment. Enhanced adhesion to the polarizer is achieved by such a surface treatment on the other side, there may be used the foregoing film or another protective film for a polarizing plate.

There are preferably used commercially available cellulose triacetate film (for example, Konica Minolta TAC KC8UX, KC4UX, KC5UX, KC8UY, KC4UY, KC12UR, KC8UCR, KC8UC, R-4, KC8UCR, KV8UY-HA, KV8UX-RHA, each made by Konica Minolta Opto, Inc.) and cycloolefin film (for example, Zeonoa Film, made by Nippon Zeon Co., Ltd.; ARTON film, made by JSR Co.).

A polarizer as a main constituent element for a polarizing plate is an element transmitting only light in a plane of polarization in a given direction. A typical polarizer film known in the art is a polyvinyl alcohol polarizer film, including a polyvinyl alcohol dyed with iodine and one dyed with a dichroic dye.

There is used a polarizer prepared in such a manner that a film formed of aqueous polyvinyl alcohol is uniaxially stretched and then dyed, or dyed and then uniaxially stretched and further treated with a boron compound for enhancement of durability.

In the foregoing adhesive layer, there is preferably used an adhesive such that at least one portion of the adhesive layer exhibits a storage modulus of $1.0 \times 10^4$ to $1.0 \times 10^9$ Pa and there is also suitably used a curable adhesive which is capable of forming a polymeric body or a cross-linking structure through various chemical reactions after coating the adhesive layer and being adhered.

Specific examples include a curable adhesive such as a urethane adhesive, an epoxy adhesive, an aqueous polymer/isocyanate adhesive or a thermally curable acryl adhesive; an anaerobic adhesive such as a moisture-curable urethane adhesive, a polyether methacrylate type, ester methacrylate type, or an oxidation type polyether methacrylate; a cyanoacrylate type instantaneous adhesive and a two-liquid type instantaneous adhesive of acrylate and peroxide.

The foregoing adhesives may be a single liquid type or a type of being comprised of two or more liquids and being mixed immediately before use. The adhesive may be a solvent type using an organic solvent as a medium, an aqueous type, such as an emulsion type using a medium mainly composed of water, a colloidal dispersion type or an aqueous solution type, or a non-solvent type.

The concentration of the foregoing adhesives may be optimally determined by layer thickness after being adhered, coating method, coating conditions and the like, and is usually within a range of 0.1 to 50% by mass.

Liquid Crystal Display

There can be prepared a liquid crystal display superior in various visibilities by installing a polarizing plate adhered with the acryl resin-containing film of the invention into a liquid crystal display. The polarizing plate related to the invention is adhered to a liquid crystal cell through the foregoing adhesive layer.

The polarizing plate related to the invention is preferably employed in a reflection type, a transmission type or a semi-transmission type LCD, or in an LCD of various driving systems such as a TN type, a STN type, an OCB type, a HAN type, a VA type (PVA type, MVA type) or an IPS type.

In a big-screen display of 30 inches type or more, specifically 30-54 inches type, there is no whitening defect and its effect is maintained over a long duration. There is also hardly observed color unevenness, glaring, wave-like unevenness or the like, and even observation over a long time does not tire the eyes.

EXAMPLES

The present invention is further described by reference to the following specific examples but the present invention is not limited thereto.

Example 1

Preparation of Acryl Resin-Containing Film
Preparation of Acryl Resin-Containing Film 1
Preparation of Dope Solution;

| | |
|---|---|
| BR85 (acryl resin, made by Mitsubishi Rayon Co.) | 70 parts by mass |
| Cellulose ester (cellulose acetate propionate total acyl group substitution degree of 2.75, acetyl group substitution degree of 0.19, propionyl group substitution degree of 2.56 Mw = 200000) | 15 parts by mass |
| Cellulose ester (cellulose acetate propionate total acyl group substitution degree of 2.73, acetyl group substitution degree of 1.08, propionyl group substitution degree of 1.84 Mw = 200000) | 15 parts by mass |
| Methylene chloride | 300 parts by mass |
| Ethanol | 40 parts by mass |

Formation of Acryl Resin-Containing Film

Using a belt casting device, the thus prepared dope solution was cast at 22° C. onto a 2 m wide stainless steel band support. After evaporating the solvent until it reached a residual solvent quantity of 100%, a web of acryl resin was peeled from the stainless steel band support at a peeling tension of 162 N/m.

From the thus peeled acryl resin web, the solvent was evaporated at 35° C., slit to a 1.6 m width and then dried at a drying temperature of 135° C., while being stretched to 1.1 times in the width direction by a tenter. The residual solvent quantity when starting stretching in the tenter was 10%.

After stretching the web with the tenter, relaxation was conducted at 130° C. for 5 min. Then the web was dried in drying zones of 120° C. and 130° C. while conveyed by a number of rolls. After completion of drying, the web was slit to a 1.5 m width. The film was subjected to knurling of 10 mm width and 5 µm height on both edges of the film and wound on a core of an inner diameter of 6 inches by an initial tension of 220 N/m and a final tension of 110 N/m to obtain acryl resin-containing film 1.

The stretching factor in the MD direction (in filming, direction) of the film 1, which was calculated from the rotation rate of the stainless steel band support and the driving rate of the tenter, was 1.1 times.

The acryl resin-containing film 1 shown in Table 2 exhibited a residual solvent quantity of 0.1%, a film thickness of 60 µm and a total wound length of 4000 m.

Acryl resin film-containing films 2-34 were each prepared in the same manner as the acryl resin-containing film 1, except that the kind and composition ratio of acryl resin (A), cellulose ester resin (B) or a resin exhibiting an Abbe's number of 30-60 other than the resins (A) and (B) was varied, as shown in Table 1.

Acryl resin-containing film 35 was also prepared in accordance with Examples 1 and 7 of JP 2007-191706A.

As shown in Tables 1 and 2, used materials are as follow:

| Code | Molecular Weight | Composition |
|---|---|---|
| BR52 | 85000 | MS |
| BR83 | 40000 | MMA |
| BR85 | 280000 | MMA |
| BR88 | 480000 | MMA |
| 80N | 100000 | MMA |

Each code represents the material as below:

MS: poly[(methyl methacrylate)-co-styrene]

MMA: poly(methyl methacrylate)

In the Table, for example, ac: 1.08 and p: 1.84 represent a cellulose acetate propionate having an acetyl group substitution degree of 1.08 and a propionyl group substitution degree of 1.84. Further, "b", "bz", "pi" and "pH" represent butyrate-, benzoate-, pivalate- and phthalate-cellulose esters, respectively, and "T" represents the total substitution degree.

The designation "KT75" represents MMA-styrene copolymer (made by Denki Kagaku Kogyo Co., Ltd.), "80N" and "BR" series represent Delpet 80N (made by Asahi Chemicals Co.) and Dianal BR52, BR83, BR85 and BR88 (made by Mitsubishi Rayon Co.).

A1-A4 were each prepared in accordance with the methods known in the art. The composition is as follows:

A1: poly(MA-MA), mass ratio 98:2, Mw: 70000,

A2: poly(MMA-MA), mass ratio 97:3, Mw: 800000,

A3: poly(MMA-MA), mass ratio 97:3, Mw: 9370000,

A4: poly(MMA-MA), mass ratio 94:6, Mw: 1100000

Synthesis of Indene-MMA Copolymer (D1);

Into a three-necked flask fitted with a stirrer and a reflux condenser provided with a calcium chloride tube were added 5 g of indene, 5 g of methyl methacrylate and 30 g of toluene and stirred in a 25° C. water bath until being uniformalized.

Subsequently, 0.05 g of iron chloride was added to initiate polymerization. One hour after the initiation of reaction, 0.09 g of iron (III) chloride was further added.

Similarly, three, four and five hours after the initiation of reaction, respectively, 0.09 g of iron (III) chloride was further added, and 50 ml of methanol was added 24 hours after the initiation of reaction to allow a polymer to be deposited to terminate the reaction.

The formed polymer was filtered off, washed with methanol and then with water, and dried under reduced pressure to remove residual methanol, whereby indene-MMA copolymer (D1) was obtained. The molecular weight (Mw) and the Abbe's number were 100000 and 44, respectively.

There was also used an indene-chroman copolymer (made by Aldrich Co., Abbe's number: 33), denoted as "D2".

To acryl resin-containing 4 or 24 were added ultraviolet absorbents, as below to prepare a dope.

Acryl Resin-Containing Film 14:

| | |
|---|---|
| Tinubin 109 (Ciba Special Chemicals) | 1.5 parts by mass |
| Tinubin 171 (Ciba Special Chemicals) | 0.7 parts by mass |

Acryl Resin-Containing Film 171:

| | |
|---|---|
| LA-31 (ADEKA) | 1.5 parts by mass |

TABLE 1

| No. | \multicolumn{6}{c}{Cellulose Ester Resin (B)} | T | Mw |
|---|---|---|---|---|---|---|---|---|
| | ac | p | b | bz | pi | ph | | |
| 1 | 0.19 | 2.56 | | | | | 2.75 | 200000 |
| 2 | 0.19 | 2.56 | | | | | 2.75 | 210000 |
| 3 | 0.19 | 2.56 | | | | | 2.75 | 250000 |
| 4 | 0.19 | 2.56 | | | | | 2.75 | 85000 |
| 5 | 0.30 | | 2.30 | | | | 2.60 | 160000 |
| 6 | 0.50 | 1.20 | 1.20 | | | | 2.90 | 180000 |
| 7 | 1.00 | 1.50 | | | | | 2.50 | 120000 |
| 8 | 1.00 | | 1.50 | | | | 2.50 | 150000 |
| 9 | 1.08 | 1.84 | | | | | 2.92 | 230000 |
| 10 | 1.20 | | | 1.30 | | | 2.50 | 120000 |
| 11 | 1.41 | 1.32 | | | | | 2.73 | 200000 |
| 12 | 1.50 | | | 1.30 | | | 2.80 | 244000 |
| 13 | 1.50 | | | | 1.30 | | 2.80 | 192000 |
| 14 | 0.19 | 2.56 | | | | | 2.75 | 70000 |
| 15 | 0.19 | 2.56 | | | | | 2.75 | 280000 |
| 16 | 0.30 | 1.50 | | | | | 1.80 | 130000 |
| 17 | 1.00 | | 1.50 | | | | 2.50 | 40000 |
| 18 | 1.05 | 1.00 | | | | | 2.05 | 180000 |
| 19 | 1.50 | | 0.70 | | | | 2.20 | 145000 |
| 20 | 1.92 | 1.00 | | | | | 2.92 | 178000 |
| 21 | 2.00 | 0.50 | | | | | 2.50 | 220000 |
| 22 | 2.90 | | | | | | 2.90 | 200000 |
| 23 | 2.12 | | 0.74 | | | | 2.86 | 204000 |
| 24 | 1.20 | | | | | 1.30 | 2.50 | 110000 |
| 25 | 1.20 | | | | | 1.30 | 2.50 | 160000 |

TABLE 2

| Acryl Resin-containing Film No. | Acryl Resin (A) | | Cellulose Ester Resin (B) | | Resin (D) | Composition Ratio (part by mass) (A)/(B)/(D) |
|---|---|---|---|---|---|---|
| | 1st | 2nd | B1 | B2 | | |
| 1 | BR85 | — | 1 | 9 | — | 70/5 + 5/0 |
| 2 | | | 1 | 9 | | 95/3 + 2/0 |
| 3 | | | 1 | 9 | | 88/6 + 6/0 |
| 4 | | | 1 | 9 | | 50/5 + 5/0 |
| 5 | | | 1 | 20 | | 35/5 + 30/0 |
| 6 | | | 1 | 9 | | 28/0 + 32/0 |
| 7 | | | 1 | 11 | | 68/2 + 30/0 |
| 8 | | | 1 | | | 30/70/0 |
| 9 | | | 1 | | D2 | 70/5/5 |
| 10 | | | 1 | | D1 | 70/4/6 |
| 11 | | BR88 | 11 | | KT75 | 45 + 5/40/10 |
| 12 | BR52 | — | 1 | 9 | | 70/15 + 15/0 |
| 13 | BR85 | — | 1 | 2 | | 70/15 + 15/0 |
| 14 | | | 1 | 3 | | 70/15 + 15/0 |
| 15 | | | 1 | 15 | | 70/15 + 15/0 |
| 16 | 80N | — | 5 | 9 | | 70/15 + 15/0 |
| 17 | BR85 | — | 1 | 17 | | 70/15 + 15/0 |
| 18 | | | 1 | 14 | | 70/15 + 15/0 |
| 19 | | | 1 | 4 | | 70/15 + 15/0 |
| 20 | | | 9 | 21 | | 70/15 + 15/0 |
| 21 | | | 9 | 18 | | 70/15 + 15/0 |
| 22 | | | 9 | 16 | | 70/15 + 15/0 |
| 23 | | | 7 | 9 | | 70/15 + 15/0 |
| 24 | | | 8 | 9 | | 70/15 + 15/0 |
| 25 | | | 9 | 10 | | 70/15 + 15/0 |
| 26 | | | 9 | 24 | | 70/15 + 15/0 |
| 27 | | | 9 | 19 | | 70/15 + 15/0 |
| 28 | BR88 | — | 6 | 9 | | 70/15 + 15/0 |
| 29 | BR85 | — | 9 | 22 | | 70/15 + 15/0 |
| 30 | BR83 | — | 1 | 9 | | 70/15 + 15/0 |
| 31 | A1 | — | 1 | 9 | | 70/15 + 15/0 |
| 32 | A2 | — | 1 | 9 | | 70/15 + 15/0 |
| 33 | A3 | — | 1 | 9 | | 70/15 + 15/0 |
| 34 | A4 | — | 1 | 9 | | 70/15 + 15/0 |
| 35 | | | | | * | |

*: Film prepared in accordance with Examples 1 and 7 of JP 2007-191706A

Evaluation Method

The thus prepared acryl resin-containing films 1-35 were evaluated as follows and the results thereof are shown in the Tables.

Haze:

Each of the prepared film samples was measured by using a haze meter (NDH Type 2000, made by Nippon Denshoku Kogyo Co., Ltd.) in accordance with JIS K-7136.

Tension Softening Point:

Using a Tensilon tester (RTC-1225A, made by ORIENTEC Co.), evaluation was made as follows.

An acryl resin-containing film sample was cut to a piece of 120 mm (length)×10 mm (width). While stretching the piece at a tension of 10N, its temperature was raised at a rate of 30° C./min and the temperature at the time when reached 9N was measured three times and the average value thereof was determined.

Ductile Fracture:

An acryl resin-containing film sample was cut to a piece of 100 mm (length)×10 mm (width). The piece was mountain-folded or valley-folded one time for each at the center in the longitudinal direction. This evaluation was conducted three times and evaluated as below. Herein the expression "being broken" represents being broken into two or more pieces.

A: Being not broken in any of the three times,
B: Being broken at least one time of the three times.

Film Deformation

An acryl resin-containing film sample was allowed to stand at 90° C. for 1000 hours in a dry atmosphere (at a relative humidity of 5% RH or less) and the extent of deformation of the film was visually observed.
  A: No deformation of a film was observed,
  B: Deformation of a film was observed,
  C: Marked deformation of a film was observed.
Cutting Property
  Using a light-load tearing tester (made by Toyo Seiki Co.), a film sample was torn and evaluated as below.
  A: The torn surface being very smooth and straightly torn,
  B: The torn surface being slightly burred but straightly torn,
  C: The torn surface being fairly burred and not straightly torn.
Film Appearance:
  Appearance of each of the prepared films was visually observed and evaluated as below.
  A: Very smooth flatness,
  B: Stretch and wrinkle or steps being slightly observed,
  C: Stretch and wrinkle or step being remarkably observed.
Determination of $R_o$ and $R_{th}$:
  An average refractive index of film constituting materials was measured by using an Abbe's refractometer. The film thickness was measured by using a commercially available micrometer.
  In a film which was allowed to stand under an environment of 23° C. and 55% RH, retardation measurement of the film at the corresponding wavelength was conducted under the same environment by using an automatic double refractometer (KOBRA-21ADH, made by Oji Keisokukiki Co., Ltd.). Inputting the foregoing average refractive index and the thickness, in-plane retardation ($R_o$) and retardation in the thickness direction ($R_{th}$) were obtained.
Determination of Photoelastic Coefficient:
  Using KOBRA-31PRW, a tensile test was conducted at ten points within a stress range of 1 N to 10 N and the retardation produced therein was measured; the stress and retardation at the respective points were plotted and from its slope, a photo elastic coefficient was calculated. Measurement was carried out in a room conditioned to 23° C. and 55% RH.
Preparation of Polarizing Plate:
  A 120 μm thick long-roll polyvinyl alcohol film was immersed into 100 parts by mass of an aqueous solution containing one part by mass of iodine and four parts by mass of boric acid and stretched at a factor of five at 50° C. in the conveyance direction to prepare a polarizing film. The acryl resin-containing film 1 prepared in Example 1 was subjected to a corona discharge treatment and adhered to one side of a polarizing film by using an adhesive.
  On the other side of the polarizing film was adhered an alkali-saponified retardation film, KC 8 UCR-5, made by Konica Minolta Opto Inc., and dried to prepare a polarizing plate 1.
  Similarly, polarizing plates 2-35 were prepared by using acryl resin-containing films 2-35. A polarizing plate prepared by using the acryl resin-containing film of the invention was superior in cutting property and easily processed.
Characteristic Evaluation of Liquid Crystal Display
Production of Liquid Crystal Display:
  Using a liquid crystal television Hitachi Wooo 32 H-90, as an IPS mode type liquid crystal display, a polarizing plate on the viewing side was peeled and each of the prepared polarizing plates 1-35 was adhered thereto so that an acryl film served as a glass plate of a liquid crystal cell.
  In that case, the film was adhered so that its absorption axis was directed in the same direction as the previously adhered polarizing plate.
  There were thus produced liquid crystal displays 1-35.
Viewing Angle Variation:
  The following evaluation was conducted using the produced liquid crystal displays 1-35.
  Using EZ-Contrast 160D (made by ELDIM Co., measurement of a viewing angle of a liquid crystal display was conducted under an environment of 23° C. and 55% RH. Subsequently, the foregoing polarizing plates, which were allowed to stand at 60° C. and 90% RH for 1000 hours, were similarly measured and evaluated based on the following four criteria:
  A: No variation in viewing angle being observed,
  B: Slight variation in viewing angle being observed,
  C: Definite variation in viewing angle being observed,
  D: Marked variation in viewing angle being observed.
Color Shift:
  Similarly to the foregoing viewing angle evaluation, the prepared polarizing plates were each adhered to produce liquid crystal displays 1-35. Subsequently, each of the displays was made to form a black display and when observed at a diagonal angle of 45°, color change was evaluated based on the following criteria:
  A: No color change being observed,
  B: Slight color change being observed,
  C: Definite color change being observed,
  D: Marked color change being observed.
The foregoing results are shown in Table 4.

TABLE 3

| Acryl Resin-containing Film No. | Haze (%) | Tension Softening Point (° C.) | Ductile Fracture | Equation (1) | (2) | (3) | (4) | Photoelastic Coefficient ($\times 10^{-8}$ cm$^2$/N) |
|---|---|---|---|---|---|---|---|---|
| 1 | 0.23 | 121 | A | 1.1 | 2.0 | 4.1 | 5.0 | 2.0 |
| 2 | 0.36 | 98 | B | −2.0 | −6.9 | 6.0 | 8.2 | −5.8 |
| 3 | 0.22 | 106 | A | 0.0 | −2.0 | 3.0 | 5.9 | −4.6 |
| 4 | 0.25 | 123 | A | 2.3 | 7.1 | 3.3 | 7.9 | 4.0 |
| 5 | 0.49 | 143 | A | 3.0 | 12.1 | 4.0 | 7.1 | 6.4 |
| 6 | 0.63 | 133 | A | 2.0 | 14.1 | 5.5 | 9.5 | 8.1 |
| 7 | 2.20 | 128 | B | 3.1 | 4.0 | 5.0 | 12.0 | 1.0 |
| 8 | 0.47 | 133 | A | 2.7 | 15.8 | 4.5 | 8.8 | 7.5 |
| 9 | 0.61 | 132 | A | 2.2 | 4.3 | 4.3 | 7.7 | 0.6 |
| 10 | 0.29 | 113 | A | 4.1 | 12.1 | 4.0 | 6.0 | 3.4 |
| 11 | 0.79 | 139 | A | 2.9 | 16.0 | 3.2 | 7.6 | 6.5 |
| 12 | 0.25 | 119 | A | 2.0 | 5.3 | 4.5 | 8.7 | 5.2 |
| 13 | 0.27 | 120 | A | 1.0 | 2.1 | 4.0 | 5.0 | 2.3 |
| 14 | 0.28 | 121 | A | 1.2 | 3.5 | 4.0 | 5.3 | 2.2 |
| 15 | 0.28 | 122 | A | 1.1 | 2.0 | 4.1 | 5.1 | 2.4 |
| 16 | 0.22 | 117 | A | 1.1 | 2.1 | 3.8 | 6.6 | 2.1 |
| 17 | 0.30 | 119 | B | 1.0 | 2.3 | 3.9 | 5.5 | 2.3 |
| 18 | 0.30 | 119 | B | 1.1 | 2.2 | 3.8 | 5.7 | 2.3 |
| 19 | 0.28 | 117 | A | 1.0 | 2.1 | 3.7 | 5.1 | 2.1 |
| 20 | 0.52 | 123 | A | 2.3 | 2.2 | 4.0 | 7.0 | 4.5 |
| 21 | 0.58 | 121 | A | 2.8 | 2.4 | 4.4 | 8.0 | 4.6 |

TABLE 3-continued

| Acryl Resin-containing Film No. | Haze (%) | Tension Softening Point (° C.) | Ductile Fracture | Equation (1) | Equation (2) | Equation (3) | Equation (4) | Photoelastic Coefficient (×10⁻⁸ cm²/N) |
| --- | --- | --- | --- | --- | --- | --- | --- | --- |
| 22 | 11.80 | 96 | B | 1.2 | 5.5 | 5.3 | 10.5 | 7.7 |
| 23 | 0.22 | 122 | A | 2.2 | 2.3 | 4.1 | 7.5 | 4.6 |
| 24 | 0.21 | 118 | A | 3.2 | 2.4 | 4.3 | 8.5 | 4.5 |
| 25 | 0.23 | 131 | A | 3.5 | 8.8 | 3.5 | 5.6 | 3.2 |
| 26 | 0.83 | 124 | A | 3.7 | 8.9 | 4.2 | 6.8 | 4.2 |
| 27 | 7.70 | 103 | B | 2.4 | 5.9 | 4.7 | 10.2 | 6.2 |
| 28 | 0.32 | 120 | A | 1.1 | 2.3 | 3.9 | 5.3 | 2.6 |
| 29 | 11.30 | 101 | B | 1.2 | 3.7 | 5.5 | 12.7 | 6.2 |
| 30 | 0.33 | 120 | B | 1.3 | 2.1 | 4.1 | 5.2 | 2.1 |
| 31 | 0.32 | 119 | B | 1.1 | 2.4 | 4.4 | 5.8 | 2.8 |
| 32 | 0.71 | 120 | A | 1.3 | 2.7 | 4.3 | 5.7 | 2.0 |
| 33 | 0.79 | 117 | A | 1.1 | 2.1 | 3.9 | 4.9 | 1.9 |
| 34 | 2.30 | 113 | A | 1.5 | 3.1 | 4.1 | 5.3 | 2.4 |
| 35 | 3.50 | 117 | B | 1.9 | 4.3 | 6.1 | 8.7 | 2.5 |

TABLE 4

| Acryl Resin-containing Film No. | Film Deformation | Cutting Property | Film Appearance | Polarizing Plate No. and Liquid Crystal Display No. | Viewing Angle Variation | Color Shift | Remark |
| --- | --- | --- | --- | --- | --- | --- | --- |
| 1 | A | A | A | 1 | B | B | Inv. |
| 2 | C | C | B | 2 | C | D | Comp. |
| 3 | B | A | A | 3 | B | B | Inv. |
| 4 | A | A | A | 4 | C | B | Inv. |
| 5 | A | A | A | 5 | C | C | Inv. |
| 6 | A | A | B | 6 | D | D | Comp. |
| 7 | A | C | B | 7 | D | D | Comp. |
| 8 | A | A | B | 8 | C | C | Inv. |
| 9 | A | B | A | 9 | C | C | Inv. |
| 10 | B | B | A | 10 | B | C | Inv. |
| 11 | A | B | A | 11 | C | C | Inv. |
| 12 | A | B | A | 12 | C | C | Inv. |
| 13 | A | A | A | 13 | B | B | Inv. |
| 14 | A | A | A | 14 | B | B | Inv. |
| 15 | A | A | A | 15 | B | B | Inv. |
| 16 | A | B | A | 16 | B | B | Inv. |
| 17 | A | C | A | 17 | B | C | Comp. |
| 18 | A | C | A | 18 | B | C | Comp. |
| 19 | A | B | A | 19 | B | B | Inv. |
| 20 | A | A | A | 20 | B | C | Inv. |
| 21 | A | A | A | 21 | B | C | Inv. |
| 22 | C | C | B | 22 | D | D | Comp. |
| 23 | A | A | A | 23 | B | C | Inv. |
| 24 | A | A | A | 24 | B | C | Inv. |
| 25 | A | A | A | 25 | B | B | Inv. |
| 26 | A | A | A | 26 | B | C | Inv. |
| 27 | C | C | B | 27 | D | D | Comp. |
| 28 | A | A | A | 28 | B | B | Inv. |
| 29 | C | C | B | 29 | D | D | Comp. |
| 30 | A | C | B | 30 | B | C | Comp. |
| 31 | A | C | B | 31 | B | C | Comp. |
| 32 | A | A | A | 32 | B | B | Inv. |
| 33 | A | A | A | 33 | B | B | Inv. |
| 34 | B | B | B | 34 | B | B | Inv. |
| 35 | A | C | A | 35 | C | C | Comp. |

The acryl resin-containing film was transparent and highly heat-resistant and was significantly improved in brittleness. It was further proved that a liquid crystal display produced by used of the acryl resin-containing film of the invention achieved an improved yield when stamping a polarizing plate or sticking the plate to a panel, and reduced color shift occurred depending on viewing angle.

What is claimed is:

1. An acryl resin-containing film satisfying the following equations (1) to (4), and exhibiting a tension softening point of 105 to 145° C. and a photoelastic coefficient of $-5.0\times10^{-8}$ to $8.0\times10^{-8}$ cm$^2$/N and not causing a ductile fracture:

$$|R_o(589)| \leq 10 \text{ nm} \quad \text{Equation (1)}$$

$$|R_{th}(589)| \leq 20 \text{ nm} \quad \text{Equation (2)}$$

$$|R_o(480) - R_o(630)| \leq 5 \text{ nm} \quad \text{Equation (3)}$$

$$|R_{th}(480) - R_{th}(630)| \leq 10 \text{ nm} \quad \text{Equation (4)}$$

wherein $R_o=(nx-ny)\times d$, $R_{th}=[(nx+ny)/2-nz]\times d$; nx is a refractive index in a direction of a slow axis in a plane of the film, ny is a refractive index in a direction perpendicular to the slow axis in the plane, nz is a refractive index in a direction of thickness; d is a thickness of the film; and numerical values of 589, 480 and 630 in parentheses are each a wavelength (nm) of a light used to measure an individual birefringence, and wherein the acryl resin-containing film comprises an acryl resin (A), a first species of a cellulose ester resin (B1) and at least one resin selected from the group consisting of a second species of the cellulose ester resin (B1), a cellulose ester resin (B2), and a resin (D) which is other than the resins (A), (B1) and (B2), and exhibits an Abbe's number of 30 to 60;

the acryl resin (A) has a weight average molecular weight of 80000 to 1000000; the cellulose ester resin (B1) has a weight average molecular weight (Mw) of 75000 to 250000, and exhibits a total degree of substitution with acyl groups (T1) of 2.00 to 2.99, in which a substitution degree with an acetyl group (ac) is from 0.10 to 1.89 and a substitution degree with acyl groups having 3 to 7 carbon atoms (r) is from 1.10 to 2.89; the cellulose ester resin (B2) exhibits a total substitution degree of the acryl group (T2) of 1.00 to 2.99, a substitution degree of the acetyl group (ac) of 0.1 to 2.99, and a substitution degree with an acyl group other than the acetyl groups of 0 to 2.89;

and the acryl resin-containing film exhibits a haze value of less than 2%.

2. The acryl resin-containing film as claimed in claim 1, wherein the acryl resin-containing film comprises the acryl resin (A) in an amount of 30 to 90% by mass, the cellulose ester resin (B) in an amount of 5 to 65% by mass and the resin (D) other than the acryl resin (A) and the cellulose resin (B) and exhibiting an Abbe's number of 30 to 60 in an amount of 0 to 50% by mass.

3. The acryl resin-containing film as claimed in claim 1, wherein the haze value is less than 1%.

4. A polarizing plate provided, on at least one side thereof, with an acryl resin-containing film, as claimed in claim 1.

5. A liquid crystal display provided with an acryl resin-containing film as claimed in claim 1.

\* \* \* \* \*